United States Patent [19]

Rogers et al.

[11] Patent Number: 4,801,111
[45] Date of Patent: Jan. 31, 1989

[54] SYSTEM FOR PROPULSION AND POSITIONING OF A TRANSITORY OBJECT

[75] Inventors: Charles E. Rogers; Fred Van Arsdell, both of Akron, Ohio

[73] Assignee: Rebecca H. Cook, Akron, Ohio

[21] Appl. No.: 813,005

[22] Filed: Dec. 24, 1985

[51] Int. Cl.[4] ............................................. B64D 27/02
[52] U.S. Cl. ........................................ 244/62; 180/7.1
[58] Field of Search ............... 244/62, 172; 74/84.5, 74/88; 227/131; 173/119; 280/11.115; 180/7.1

[56] References Cited

U.S. PATENT DOCUMENTS

| | | | |
|---|---|---|---|
| 2,636,340 | 4/1953 | Llamozas | 74/84.5 |
| 3,266,233 | 8/1966 | Farrall | 74/84.5 |
| 3,404,854 | 10/1968 | DiBella | 244/62 |
| 3,889,543 | 6/1975 | Mast | 74/88 |
| 3,957,162 | 5/1976 | Soderqvist | 180/7.1 |

FOREIGN PATENT DOCUMENTS 2822424 12/1979 Fed. Rep. of Germany ...... 244/172
2499162 8/1982 France ................................ 244/172

*Primary Examiner*—Joseph F. Peters, Jr.
*Assistant Examiner*—Rodney Corl
*Attorney, Agent, or Firm*—Mack D. Cook, II

[57] ABSTRACT

A system for propulsion and positioning of a transitory object and having access to a DC electrical power source. The primary electrical component of the system is a coil for generating a magnetic field. The primary mechanical components of the system are an impact piston movable in response to the magnetomotive force of the coil and a force transmission device secured to the transitory object and having a surface receiving impact energy.

1 Claim, 2 Drawing Sheets

SYSTEM FOR PROPULSION AND POSITIONING OF A TRANSITORY OBJECT

BACKGROUND OF THE INVENTION

The invention as disclosed is a system for propulsion and positioning of a transitory object. The system has access to a DC electrical power source. The system has electrical components and mechanical components. The primary electrical component is a coil means for generating a magnetic field. The primary mechanical components are an impact piston means movable in response to the magnetic field generated by the coil means; and, an impact energy transmission means secured to the transitory object and having a surface for receiving impact energy delivered during a "forward" movement of the impact piston means.

To cause motion of the transitory object, the velocity of "forward" and "reverse" movements of the impact piston means must be different. Motion will occur because of a difference in $MV^2$, in both directions, in the inertial energy formula $E=\frac{1}{2}MV^2$. The energy of the impact piston means will be equivalent to $\frac{1}{2}MV^2$ in both directions. However, when the velocity or rate of movement of the impact piston means is different in opposite directions, the "$V^2$" will be different so that the transitory object will be moved in the direction of the higher "$V^2$".

For optimum efficiency of the propulsion system, the impact piston means should have an increasing acceleration, which may increase at a constant rate, in the "forward" direction and a relatively low rate of movement, which may also be a constant rate, in the "reverse" direction. The magnitude of energy transferred to the transitory object will be exponentially related to the velocity of the impact piston means immediately prior to and at the moment of contact thereof with the impact energy transmission means.

SUMMARY OF THE INVENTION

The object of the invention is to provide an improved system for propelling or postioning a transitory object.

Still further it is an object of the invention to provide a system for delivery of impact energy which may be actuated by an unlimited source of DC electrical power.

These and other objects of the inventions, as well as the advantages thereof, will become apparent in view of the drawings and the detailed description.

In general, the invention relates to a system installed within and for propulsion of a transitory object. The system has access to a DC power source and includes electrical and mechanical components.

The electrical components comprise a first and second adjustable resistance means each receiving a current from the DC power source. A first circuit transmits a current from the first resistance means to and from a control element having a cyclic output function. A second circuit transmits a current from a second resistance means to a switch element having an on/off function and selectively actuated by the control element. A third circuit transmits a current through the switch element to a remotely located coil for generating a magnetic field and then to the second resistance means.

The mechanical elements include a force transmission means secured to the transitory object and having a surface for receiving impact energy. A mounting sleeve positions the electromagnetic coil so that the magnetomotive force thereof will be exerted substantially perpendicular to the force transmission means surface. An impact piston means responsive to the magnetomotive force is moveable toward and away from the force transmission means surface. A stop means positions the piston means within the range of the magnetomotive force when the piston means is away from the force transmission means surface. A return means exerts a force for moving the piston means toward the stop means.

During operation of the system, adjustment of the first resistance means will establish the frequency of movement of the piston means responsive to the magnetomotive force and into contact with the force transmission means surface. Adjustment of the second resistance means will determine the velocity of the piston means when contacting the force transmission means surface. The force exerted by the return means should be such that the velocity of the piston means when contacting the stop means will be less than the velocity of the piston means when contacting the force transmission means surface.

IN THE DRAWINGS

DETAILED DESCRIPTION OF THE INVENTION

Figure 1:
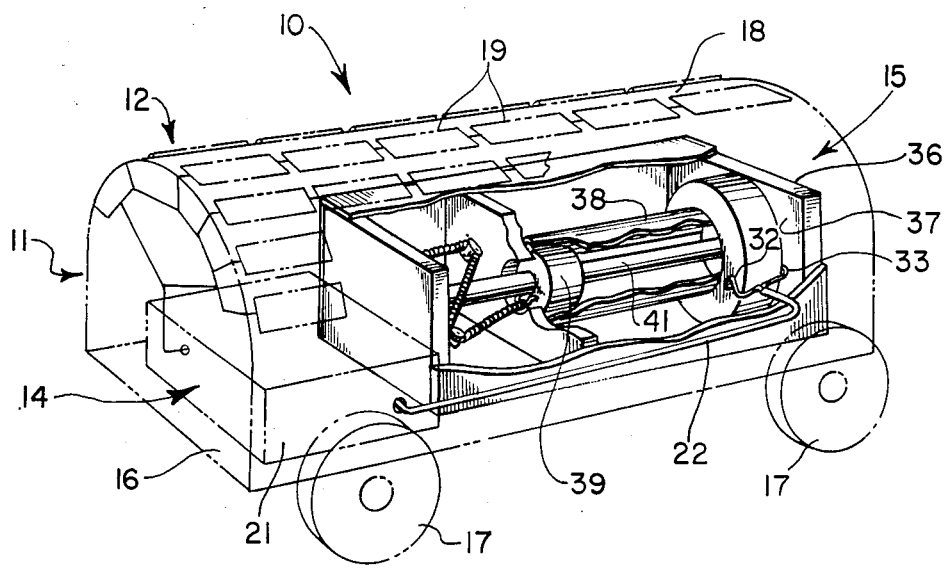
FIG. 1 shows an embodiment of a transitory object or vehicle embodying a propulsion system according to the invention, the DC power being supplied by photovoltaic cells.

A propulsion system according to the invention is referred to generally by the numeral 10. The system 10 is installed within and is used for propulsion of a transitory object or vehicle referred to generally by the numeral 11. The system 10 has access to a DC power source referred to generally by the numeral 12. The system 10 has a series of electrical components referred to generally by the numeral 14 and a set of mechanical components referred to generally by the numeral 15.

Figure 3:
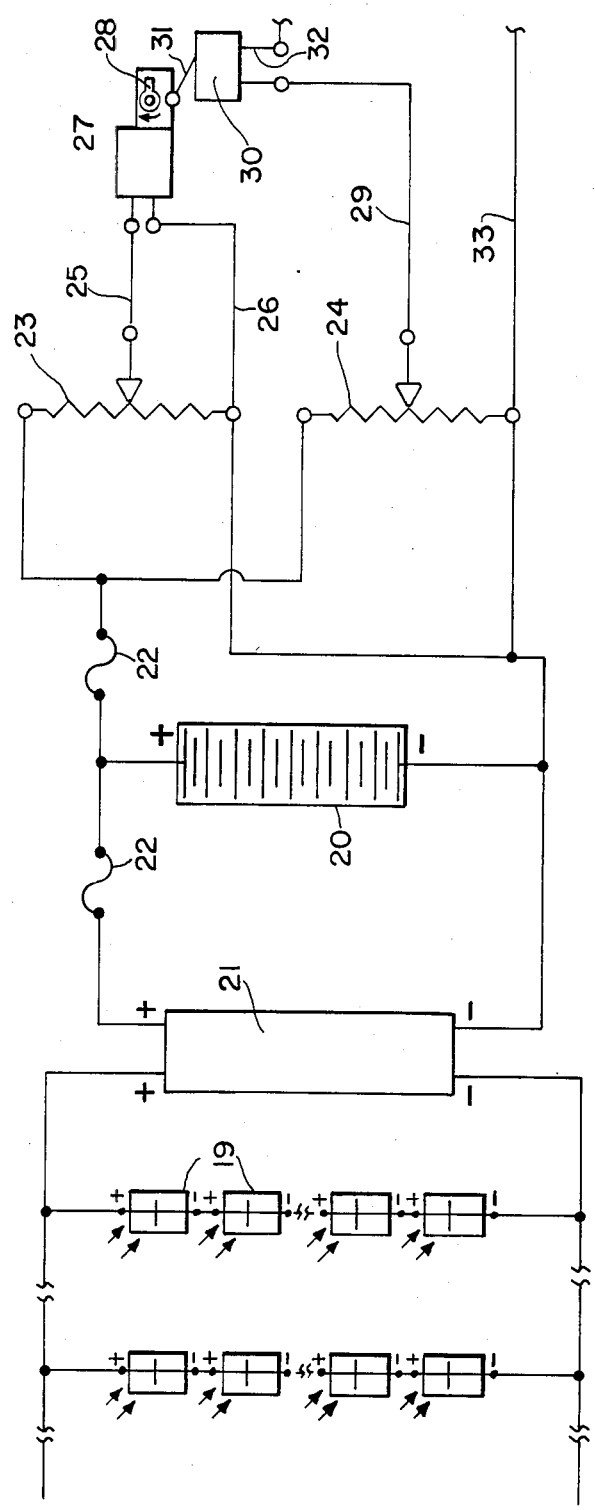

Referring to FIG. 1, the vehicle 11 may have a base or frame member 16 with wheels 17. The frame carries a cowling or roof 18. The cowling 18 mounts a series of known photovoltaic cells 19 providing the current input for the DC power source 12. Referring to FIG. 3, the photovoltaic cells 19 may supply a series of dry type storage batteries 20 providing the current storage for the DC power source 12. Preferably, the current from the photovoltaic cells 19 passes through a known solid state voltage regulator 21 to eliminate the possibility of voltage fluctuations. Also, the current transmission lines are preferably conventionally fused, as indicated at 22.

The electrical components 14 of a system 10 include a first adjustable resistance means 23 and a second adjustable resistance means 24, each receiving current from the DC power source 12. A first circuit 25, 26 transmits a current from and to the resistance means 23 and a control element 27. The control element 27 has a cyclic function which may be performed by a rotary cam 28. A second circuit 29 transmits a current from the resistance means 24 to a switch element 30. The switch element 30 has an on/off function which may be performed by a striker arm 31 selectively actuated by the control element rotary cam 28. A third circuit 32, 33 transmits a current through the switch element 30 to a remotely located coil 35 for generating a magnetic field and then to the resistance means 24.

The mechanical components 15 of a system 10 comprise a force transmission means 36 secured to the vehicle frame member 16. The force transmission means 36 has a surface 37 for receiving impact energy. The force transmission means 36 may also mount an end of a mounting sleeve 38 for positioning the electromagnetic coil 35 so that the magnetomotive force thereof will be exerted substantially perpendicular to the force transmission means surface 37. An impact piston means 39 is responsive to the magnetomotive force of the electromagnetic coil 35. The impact piston means 39 is movable toward and away from the force transmission means surface 37. As shown, the impact piston means 39 has axial roller bearings 40 and is movably carried on a coaxial piston shaft 41. One end of the piston shaft 41 is connected to the force transmission means 36 and secured thereto as by a fastening nut 42. The medial portion of the piston shaft 41 extends through an enlarged diameter axial bore 43 in a medial plate 44. The other end of the piston shaft 41 is connected to an end plate 45 and secured thereto as by a fastening nut 46.

Figure 2:
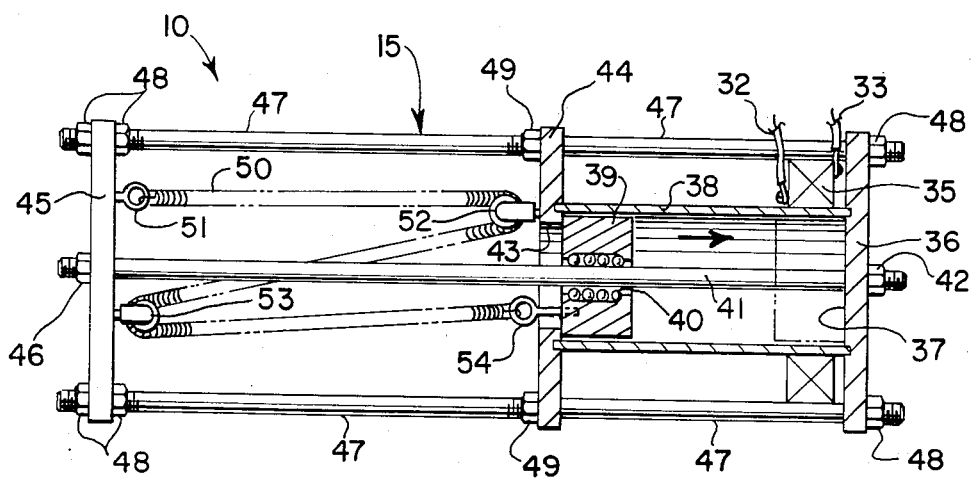
FIG. 2 is a plan view of the mechanical components of the propulsion system within the vehicle of FIG. 1; and, FIG. 3 is a schematic view of the electrical components of the propulsion system within the vehicle of FIG. 1.

As shown in FIG. 2, the force transmission means 36, the medial plate 44 and the end plate 45 form a generally rectangular structure which may be interconnected by a series of lateral rods 47 secured as by fastening nuts 48. The medial plate 44 also functions as a stop means for positioning the impact piston means 39 within the range of the magnetomotive force of the electromagnetic coil 35 when the piston means 39 is away from the force transmission means surface 37.

The mechanical components 15 of a system 10 also include a return means exerting a force for moving the impact piston means 39 toward the medial plate 44. As shown, the return means is an elongated tension spring 50. One end of the spring 50 is connected as by an eye bolt 51 to the end plate 45. The spring 50 is trained around a pulley 52 connected to the medial plate 44. The spring 50 returns toward the end plate 45 and is trained around a pulley 53 connected thereto. The spring 50 is led around the pulley 53 and connected through the medial plate bore 43 to the impact piston means 39 as by an eye bolt 54.

What is claimed is:

1. In a system (10) for propulsion of a transitory object (11), said system having a force transmission means surface (37) on said object, an electromagnetic coil (35) positioned so that the magnetomotive force thereof will be exerted substantially perpendicular to said force transmission means surface, an impact piston means (39) responsive to said magnetomotive force being movable toward and away from said force transmission means surface, and a stop means (44) arranged substantially perpendicular to the direction of movement of said impact piston means, the improvements wherein:

said electromagnetic coil is positioned apart from and out of contact with said force transmission means surface;

said piston means when moved toward said force transmission means surface being movable coaxially within and out of contact with said electromagnetic coil; and, said stop means positions said piston means within the range of said magnetomotive force when said piston means is away from said force transmission means surface;

the velocity of movement of said piston means relative to said force transmission means surface and according to $E = \frac{1}{2}MV^2$ having an increasing acceleration in the direction toward said force transmission means surface and a relatively low rate of movement in the direction away from said force transmission means surface, the magnitude of energy transferred to said transitory object being exponentially related to the velocity of said piston means immediately prior to and at the moment of contact thereof with said force transmission means surface.

* * * * *